United States Patent Office 2,705,471
Patented Apr. 5, 1955

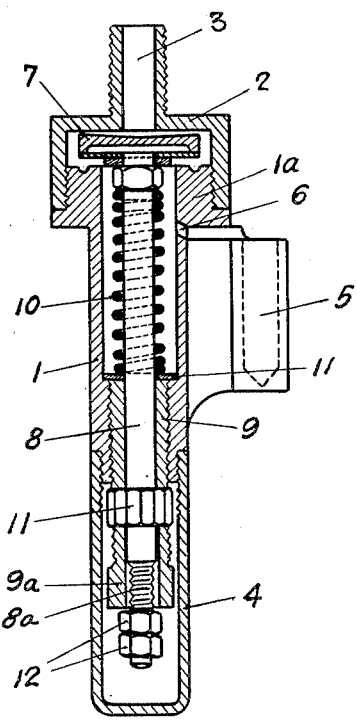

2,705,471

WARNING DEVICE FOR PUNCTURES

Pierre Lagrange, Abbeville, Somme, France

Application November 3, 1953, Serial No. 390,022

Claims priority, application France November 6, 1952

3 Claims. (Cl. 116—34)

The present invention relates to a sound-warning apparatus which can be mounted on the wheels of automobile vehicles, and in particular of heavy lorries, light vans and touring cars, so as to give an immediate warning to the driver, of any puncture occurring in one of the pneumatic tires of his vehicle.

The warning device in accordance with the invention is essentially characterised by the fact that it comprises a tubular body mounted on the end of the tire valve, in which is arranged a further valve which is constantly forced towards its open position by a calibrated spring and which is maintained on its seating by the pressure which obtains within the interior of the inner tube of the tire by means of which the valve lifts away from its seating when the pressure within the interior of the inner tube falls as a result of a puncture and enables the air thus liberated to act on a whistle communicating with the tubular body on the open side of the said valve.

Other features and advantages of the present invention will become clear from the description thereof which is given below with reference to the attached drawing which shows diagrammatically and merely by way of example, an axial longitudinal cross-section of one possible form of embodiment of the warning device in accordance with the invention.

This apparatus is essentially constituted by a tubular sleeve 1, the upper extremity 1a of which is arranged in such a way as to form a valve seat and is provided with an external thread on which there is screwed a cap 2 which comprises a passage 3 connected to and communicating with the valve (not shown) of the tire, so that the interior of the cap 2 is placed under the pressure which obtains inside the chamber. On the lower portion of the tubular sleeve 1 there is screwed an airtight cap 4, whilst a whistle 5 is fixed to the exterior of the sleeve 1 so that it can be operated by air passing out of the interior of the sleeve 1 through an orifice 6.

In the interior of the cap 2 there is arranged the head of a valve 7, the rod 8 of which is adapted to slide in a guide member 9, this valve head being intended to close-off the passage between the passage 3 and the tubular sleeve 1 when it is in place on its seat 1a. A spring 10 supported on the one hand by the base of the head of the valve, and on the other hand by a washer 11 resting on the upper extremity of the guide 9, constantly urges the valve towards its open position. The tension of the spring 10 is readily controlled by the fact that the guide 9 is threaded on its outside and that its relative position with respect to the tubular sleeve 1 may be modified by screwing it more or less into the interior of the said sleeve which is threaded internally for that purpose. The locking in position of the guide 9 is obtained by means of a nut 11 which is adapted to screw tightly against the lower face of the sleeve 1. In order to prevent the valve 7 from closing-off the opening of the channel 3, the travel of the rod 8 towards the top may be limited to the desired value by means of a nut and locking-nut 12 screwed on to the lower threaded extremity 8a of the rod 8 and butting up against the lower face 9a of the guide 9.

The apparatus which has just been described operates in the following way:

The tire is inflated and then, after having regulated the tension of the spring 10 to a value such that if the valve 7 is subjected to a pressure slightly less than that obtaining in the tire, it is able to overcome the tension of the said spring 10 at the desired pressure, the apparatus is connected to the valve so as to put the channel 3 in communication with the interior of the air chamber or inner tube. The result of this is obviously to cause the valve 7 to be forced down on its seat 1a against the action of the spring 10 and, in consequence, to shut-off the passage of air to the tubular sleeve 1. At this moment, the apparatus plays the part of an ordinary tire valve.

Under the effect of a puncture, the pressure in the interior of the inner tube, as it falls, enables the valve 7 to lift away from its seat 1a under the impulsion of the spring 10, up to its upper limit position. At that moment, the air can pass freely into the interior of the tubular sleeve 1 and thence through the orifice 6 past the whistle 5. The driver of the vehicle is, in consequence, immediately warned of the puncture which has occurred in the tire.

This apparatus has very many advantages:
It is wholly mechanical; it is very simple; it ensures a minimum pressure in the tires; it ensures an effective control of punctures and enables running on a flat tire to be avoided, in particular in the case of vehicles equipped with twin wheels; it is extremely easy to adapt and to adjust.

It will be quite clear that the invention has been described and shown only in a purely explanatory way and not in any limiting sense and that modifications of detail may be made to it without thereby departing from the spirit or the scope of the invention.

I claim:

1. A sound warning device for indicating punctures in a pneumatic tire, comprising a tubular body adapted to engage the tire valve, said tubular body including a cap having a passage communicating with said tire valve and a tubular sleeve threadedly engaging said cap, a chamber being defined between said cap and sleeve, said sleeve having a central bore formed therein, a sound warning device integrally joined to said sleeve and communicating with said central bore, a valve having a stem extending through the bore of said sleeve and a head located in said chamber and responsive to a predetermined pressure in said tire for sealing said bore from the interior of said tire, spring means for urging said valve head out of engagement with said bore when the pressure in said tire falls below the predetermined limit, means adjusting said spring means, and means for limiting the longitudinal travel of said stem, said spring means causing said valve head to move out of engagement with the sleeve bore when the pressure drops in said tire to allow the air in said tire to enter said sound warning device thereby causing said sound warning device to emit an audible signal.

2. A sound warning device for indicating punctures in a pneumatic tire as set forth in claim 1, wherein said adjusting means includes a hollow guide threadedly engaging said tubular sleeve and receiving said stem therein, said guide operatively engaging said spring means and being longitudinally movable to adjust the tension, and a lock nut threadedly engaging said hollow guide and adapted to abut against the end of said sleeve to lock said guide in the adjusted position.

3. A sound warning device for indicating punctures in a pneumatic tire as set forth in claim 1, wherein said limiting means includes a locking member threadedly engaging the end of said stem, said locking member engaging the end of said adjusting means for limiting movement of said stem thereby limiting the movement of said valve head in said chamber.

References Cited in the file of this patent

UNITED STATES PATENTS

| | | |
|---|---|---|
| 1,010,726 | Collins | Dec. 5, 1911 |
| 1,298,538 | Meyers et al. | Mar. 25, 1919 |
| 1,662,968 | Garrett | Mar. 20, 1928 |
| 1,773,394 | Galbraith | Aug. 19, 1930 |
| 1,878,411 | Lambert | Sept. 20, 1932 |